United States Patent
Krishnan et al.

(10) Patent No.: US 9,909,344 B2
(45) Date of Patent: Mar. 6, 2018

(54) KEYLESS VEHICLE DOOR LATCH SYSTEM WITH POWERED BACKUP UNLOCK FEATURE

(71) Applicant: Ford Global Technologies, LLC, Dearborn, MI (US)

(72) Inventors: Venkatesh Krishnan, Canton, MI (US); Livianu Dorin Puscas, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 14/468,634

(22) Filed: Aug. 26, 2014

(65) Prior Publication Data

US 2016/0060909 A1    Mar. 3, 2016

(51) Int. Cl.

| | |
|---|---|
| *E05B 81/56* | (2014.01) |
| *E05B 81/80* | (2014.01) |
| *E05B 81/82* | (2014.01) |
| *E05B 81/86* | (2014.01) |
| *B60R 25/24* | (2013.01) |
| *G07C 9/00* | (2006.01) |

(52) U.S. Cl.
CPC ............ *E05B 81/56* (2013.01); *E05B 81/80* (2013.01); *E05B 81/82* (2013.01); *E05B 81/86* (2013.01); *G07C 9/00182* (2013.01); *B60R 25/245* (2013.01); *G07C 2009/00634* (2013.01); *G07C 2009/00769* (2013.01)

(58) Field of Classification Search
CPC .................................. E05C 3/06; H04B 1/16
See application file for complete search history.

(56) References Cited

U.S. PATENT DOCUMENTS

| 4,206,491 A | 6/1980 | Ligman et al. |
| 5,039,145 A * | 8/1991 | Frye ................... E05B 85/12 |
| | | 292/143 |

(Continued)

FOREIGN PATENT DOCUMENTS

| DE | 4403655 A1 | 8/1995 |
| EP | 0372791 A2 | 6/1990 |

(Continued)

OTHER PUBLICATIONS

U.S. Appl. No. 14/718,448, Office Action, dated Apr. 4, 2016, 38 pages.

*Primary Examiner* — Alex C Dunn
(74) *Attorney, Agent, or Firm* — Jason Rogers; Price Heneveld LLP

(57) ABSTRACT

A keyless door latch system for doors of motor vehicles includes a backup electrical power supply to unlock the door latch in the event the primary power supply fails, thereby eliminating the need for a lock cylinder. The latch system includes a user input device having first and second user input features. The door latch system is configured to supply electrical power from the primary electrical power supply to unlock the latch upon actuation of the first user input feature, and to supply electrical power from the backup electrical power supply to unlock the latch upon actuation of the second user input feature. The user input device may comprise a wireless portable device that generates first and second wireless signals upon actuation of the first and second user input features, respectively.

20 Claims, 5 Drawing Sheets

(56) References Cited

U.S. PATENT DOCUMENTS

| | | | |
|---|---|---|---|
| 5,497,641 A | 3/1996 | Linde et al. | |
| 5,547,208 A | 8/1996 | Chappell et al. | |
| 5,744,874 A * | 4/1998 | Yoshida | B60R 16/0315 307/10.1 |
| 5,783,994 A | 7/1998 | Koopman, Jr. et al. | |
| 6,056,076 A | 5/2000 | Bartel et al. | |
| 6,198,995 B1 * | 3/2001 | Settles | B60R 16/0315 307/10.7 |
| 6,271,745 B1 | 8/2001 | Anazi et al. | |
| 6,480,098 B2 * | 11/2002 | Flick | B60R 25/04 307/10.2 |
| 6,606,492 B1 | 8/2003 | Losey | |
| RE38,338 E * | 12/2003 | Yoshida | B60R 16/0315 180/287 |
| 6,734,578 B2 * | 5/2004 | Konno | B60R 25/02 307/10.2 |
| 6,829,357 B1 * | 12/2004 | Alrabady | H04L 9/0656 380/260 |
| 6,883,836 B2 | 4/2005 | Breay et al. | |
| 6,914,346 B2 | 7/2005 | Girard | |
| 7,106,171 B1 | 9/2006 | Burgess | |
| 7,176,810 B2 * | 2/2007 | Inoue | G08G 1/096716 340/10.1 |
| 7,224,259 B2 | 5/2007 | Belmond et al. | |
| 7,263,416 B2 * | 8/2007 | Sakurai | F02D 41/062 307/9.1 |
| 7,576,631 B1 * | 8/2009 | Bingle | E05B 81/76 340/5.54 |
| 7,642,669 B2 | 1/2010 | Spurr | |
| 8,126,450 B2 | 2/2012 | Howarter et al. | |
| 8,376,416 B2 * | 2/2013 | Arabia, Jr. | E05B 81/82 292/201 |
| 8,398,128 B2 * | 3/2013 | Arabia | E05B 77/06 292/1 |
| 8,534,101 B2 | 9/2013 | Mette et al. | |
| 2002/0121967 A1 | 9/2002 | Bowen et al. | |
| 2004/0093155 A1 * | 5/2004 | Simonds | H04L 67/12 701/532 |
| 2004/0124708 A1 | 7/2004 | Giehler et al. | |
| 2004/0177478 A1 * | 9/2004 | Louvel | E05B 81/78 16/430 |
| 2006/0056663 A1 * | 3/2006 | Call | B60R 25/25 382/115 |
| 2006/0100002 A1 * | 5/2006 | Luebke | G06F 3/0362 455/574 |
| 2008/0060393 A1 * | 3/2008 | Johansson | E05B 47/063 70/91 |
| 2008/0224482 A1 | 9/2008 | Cumbo et al. | |
| 2009/0145181 A1 | 6/2009 | Pecoul et al. | |
| 2010/0052337 A1 | 3/2010 | Arabia, Jr. et al. | |
| 2011/0203336 A1 | 8/2011 | Mette et al. | |
| 2014/0088825 A1 | 3/2014 | Lange et al. | |
| 2014/0200774 A1 | 7/2014 | Lange et al. | |
| 2014/0242971 A1 | 8/2014 | Aladenize et al. | |
| 2014/0338409 A1 | 11/2014 | Kraus et al. | |
| 2014/0347163 A1 | 11/2014 | Banter et al. | |
| 2015/0001926 A1 | 1/2015 | Kageyama et al. | |
| 2016/0060909 A1 | 3/2016 | Krishnan et al. | |
| 2016/0153216 A1 * | 6/2016 | Funahashi | E05B 81/80 292/2 |

FOREIGN PATENT DOCUMENTS

| | | |
|---|---|---|
| EP | 0694664 A1 | 1/1996 |
| GB | 2402840 A | 12/2004 |
| GB | 2496754 A | 5/2013 |
| JP | 406167156 A | 6/1994 |
| JP | 406185250 A | 7/1994 |
| JP | 2000064685 A | 2/2000 |
| WO | 0123695 A1 | 4/2001 |

* cited by examiner

KEYLESS VEHICLE DOOR LATCH SYSTEM WITH POWERED BACKUP UNLOCK FEATURE

FIELD OF THE INVENTION

The present invention generally relates to door locks for motor vehicles, and more particularly to a powered door lock having a backup powered unlock feature that eliminates the need for an exterior lock cylinder and key.

BACKGROUND OF THE INVENTION

Driver's doors of motor vehicles typically include a door latch that selectively retains the door in a closed position. The latch may include a door lock system that includes a lock cylinder that is accessible from the exterior of the vehicle door. The door may also include a powered door lock that can be actuated utilizing an interior switch or a remote wireless fob. If the wireless remote fob malfunctions, a user can typically still gain access by inserting a key into the lock cylinder to mechanically unlock the driver's door lock. However, the use of mechanical lock cylinders, keys, and linkages tends to add to the complexity and cost of the vehicle.

SUMMARY OF THE INVENTION

One aspect of the present invention is a keyless door latch system for doors of motor vehicles that does not require a lock cylinder and key. The keyless door latch system includes a door latch and a powered lock configured to be operably connected to a first electrical power supply. The powered lock defines locked and unlocked conditions whereby the latch is released upon movement of an exterior door handle when the powered lock is unlocked, and wherein the latch does not release upon movement of an exterior door handle when the powered lock is locked. The system includes a first electrical power supply and an electronic controller that is operably connected to the powered lock. The system further includes a backup device including a second electrical power supply configured to be operably connected to the powered lock. A user input device is configured to communicate with the electronic controller and/or with the backup device. The user input device may include first and second user input features. The system is configured to cause the electronic controller to unlock the powered lock utilizing electrical power from the first electrical power supply if a user actuates the first user input feature. The system is configured to cause the backup device to unlock the powered lock utilizing electrical power from the second electrical power supply if a user actuates the second user input feature. The user input device may comprise a wireless communication device that transmits wireless signals to the electronic controller and/or to the backup device. The electronic controller and the backup device may include receivers that are configured to receive wireless signals from the user input device. The user input device may include first and second power sources such as first and second electrical batteries whereby the second battery can be utilized to generate a wireless signal to the backup device in the event the first battery fails.

Another aspect of the present invention is a powered door latch including a latch having an electrically powered lock. The powered door latch also includes first and second electrical power supplies and a wireless remote device such as a fob having first and second user inputs. When the first and second user inputs are actuated, electrical power is supplied to the lock from the first and second electrical power supplies, respectively, whereby the latch can be unlocked utilizing power from the second electrical power supply even if the first electrical power supply fails. The wireless remote fob may be configured to generate a first wireless signal upon actuation of the first user input. The powered door latch may also include a first receiver configured to receive the first wireless signal, and wherein the first receiver is configured to cause the first electrical power supply to supply electrical power to the electrically powered lock such that the electrically powered lock is unlocked. The wireless remote fob may be configured to generate a second wireless signal upon actuation of the second user input. The powered door latch may also include a second receiver configured to receive the second wireless signal, and wherein the second receiver is configured to cause the second electrical power supply to supply electrical power to the electrically powered lock such that the electrically powered lock is unlocked.

Another aspect of the present invention is a keyless door latch system for doors of motor vehicles including a door latch and a powered lock that selectively prevents unlatching of the door latch when the powered lock is in a locked state. The door latch system also includes first and second electrical power supplies, and a user input device having first and second user input features. The door latch system is configured to supply electrical power from the first electrical power supply to the powered lock to unlock the powered lock upon actuation of the first user input feature. The system is also configured to supply electrical power from the second electrical power supply to unlock the powered lock upon actuation of the second user input feature. The user input device may comprise a wireless portable device that is configured to generate a first wireless signal upon actuation of the first user input feature, and to generate a second wireless signal upon actuation of the second user input feature. The door latch system may include first and second receivers that are operably connected to the first and second electrical power supplies, respectively. The first and second receivers may be configured to receive the first and second wireless signals, respectively, to unlock the powered lock.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
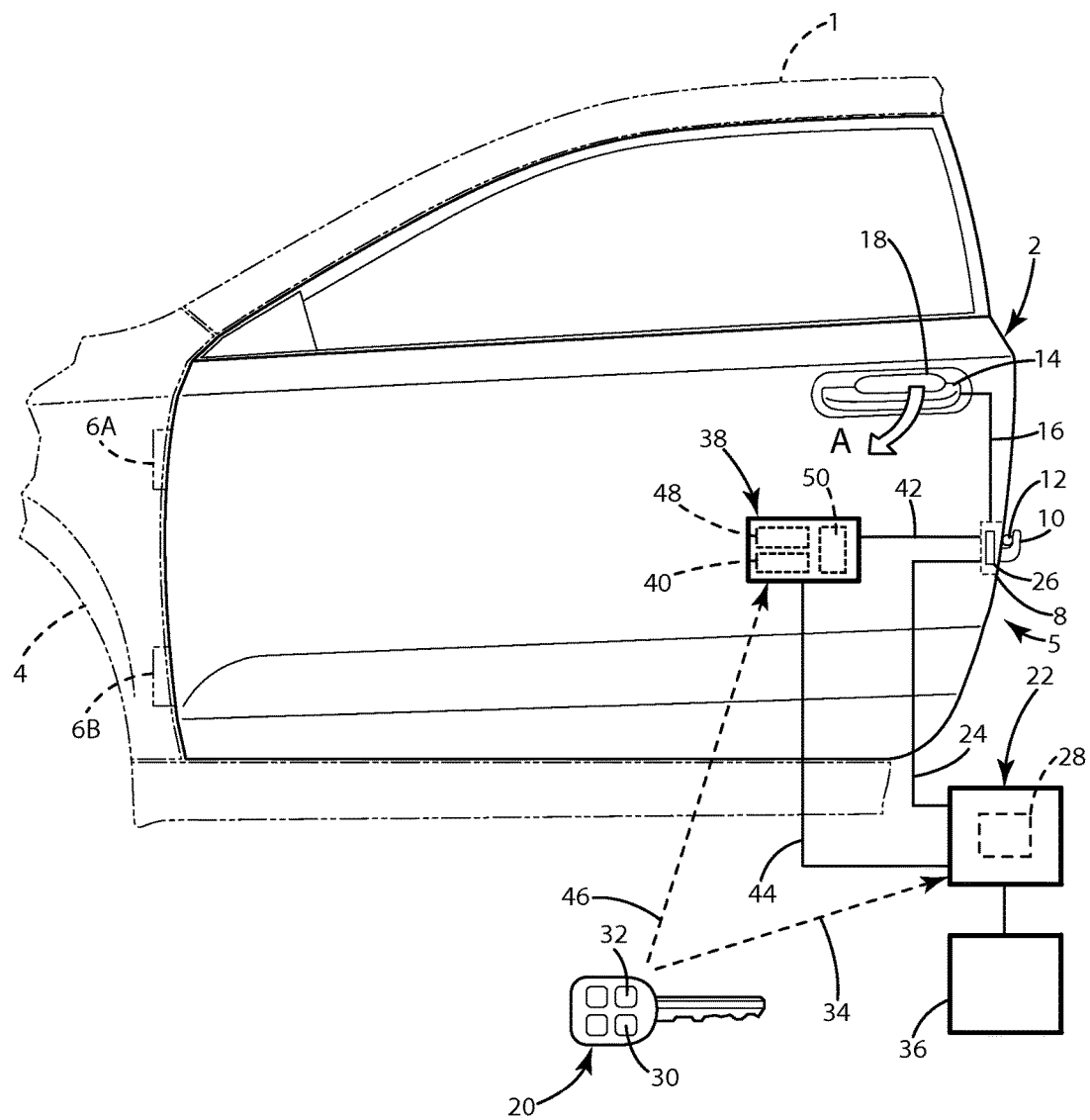
FIG. 1 is a partially schematic side elevational view of a vehicle door including a latch and powered lock system according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a motor vehicle 1 includes a driver's side door 2 that does not have a lock cylinder of the type that receives a key to mechanically unlock the door 2. Door 2 is movably mounted to a vehicle structure 4 by hinges 6A and 6B. A latch 8 includes a movable latch member 10 that selectively engages a striker 12 to retain the door 2 in a closed position, and a lock 26. The latch 8 may be operably connected to a movable exterior door handle 14 by mechanical linkage 16. The linkage 16 may comprise elongated link members, a cable, or other suitable mechanical connection. If the lock 26 of door 2 is in an unlocked state, a user can move the handle 14 as indicated by the arrow "A" to thereby cause the latch 8 to unlatch, permitting the door 2 to be opened. Specifically, latch 8 may include a pawl (not shown) of a known configuration that selectively retains the latch member 10 in a latched position. When the latch 8 of door 2 is unlocked, movement of the handle 14 causes the pawl to shift to a released position, thereby allowing movement of latch member 10 whereby the latch member 10 disengages from striker 12 as door 2 is pulled open. However, if the lock 26 of latch 8 is in a locked state, movement of the handle 14 does not release the pawl, such that the movable latch member 10 remains in an engaged position relative to striker 12, thereby preventing opening of the door 2. The basic operation of latch 8 as just described is well known to those skilled in the art, such that a more detailed description concerning the operation of the pawl, latch member 10, and striker 12 is not believed to be required.

The keyless latch system of the present invention further includes a control module 22 that is operably connected to the latch 8 by a conductive line 24 or the like. Lock 26 may comprise an electrically powered lock that is operably connected to the control module 22. The powered lock 26 is operably connected to a main vehicle power supply such as a battery 36 by control module 22 if receiver 28 of module 22 receives a wireless signal 34 from a fob or wireless user input device 20. A first input feature such as a push button 30 on keyfob 20 may be pushed by a user to generate wireless signal 34 that is received by receiver 28 of control module 22, and the control module 22 then causes powered lock 26 to receive power from battery 36 to unlock the latch 8. Remotely actuated powered door locks are known, such that a detailed description of this aspect of the latch system is not believed to be required.

In contrast to conventional driver's doors, driver's door 2 does not include a lock cylinder that receives a key to mechanically unlock latch 8 in the event the user does not have a remote fob or if the remote fob fails. Rather, the driver's door 2 includes a backup module 38 having a second receiver 40 that is configured to receive a second wireless signal 46 that is generated by the keyfob 20 upon actuation of second input 32. The backup module 38 includes a controller or circuit arrangement 50 that causes electrical power from a backup power supply 48 to be supplied to powered lock 26 through an electrical line 42 when second wireless signal 46 is received by second receiver 40. The backup power supply 48 may comprise a battery, capacitor, or other suitable power supply. As discussed in more detail below, backup power supply 48 provides for unlocking of powered lock 26 even if main power supply 36 fails. Furthermore, as discussed in more detail below, the backup power supply 48 may be operably connected to control module 22 and/or main vehicle battery 36 to recharge backup power supply 48 if required.

Figure 2:
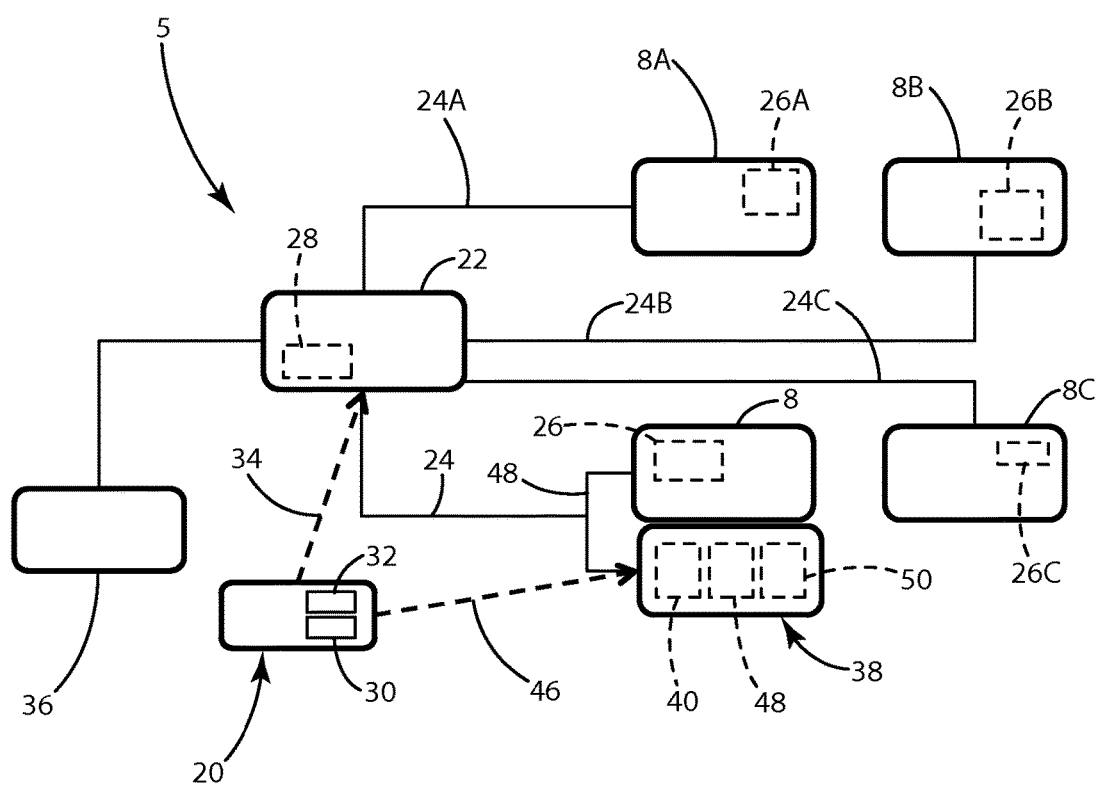
FIG. 2 is a schematic drawing of a latch and powered lock system according to one aspect of the present invention.

With further reference to FIG. 2, control module 22 may also be connected to right hand front latch 8A by a line 24A. Similarly, the control module 22 may be connected to a right rear latch 8B by a line 24B, and a left rear latch 8C by a line 24C. One or more interior switches (not shown) may be operably connected to the control module 22 whereby occupants of the vehicle can actuate the switches, thereby causing the control module 22 to supply power from battery 36 to the powered locks 26, 26A, 26B, and 26C of door latches 8, 8A, 8B, and 8C, respectively, in a manner that is generally known in the art.

As discussed above, the user input device 20 may include first and second input features 30 and 32. The input features 30 and 32 may comprise push buttons or other suitable features. For example, the remote device 20 may comprise a portable device (e.g. "smart phone") having a touch screen that displays icons forming the first and second input features 30 and 32. Alternatively, the first and second input features 30 and 32 may comprise push buttons as noted above. Thus, the user input device 20 may comprise a portable keyfob, or it may comprise a mobile phone or other suitable device.

As discussed in more detail below in connection with FIG. 8, keyfob 20 may include a first battery 62 and a second battery 64. The first battery 62 may be configured to supply electrical power when first input 30 is actuated to thereby generate a first wireless signal 34. The second battery 64 may comprise a backup battery that generates a second wireless signal 46 upon actuation of second input 32. Thus, the keyfob 20 has redundancy with respect to the power supply and inputs utilized to generate the wireless signals 34 and 46. The second battery 64, second input 32, backup power supply 48, second receiver 40, and other related components define a backup system that can be utilized to unlock powered lock 26 in the event a component or a combination of components in the primary system (first input 30, first battery 62, first receiver 28, controller 22, and battery 36) fail. This redundancy significantly reduces the chances that both the primary unlock system and the backup unlock system both fail simultaneously such that a user cannot gain access to the interior of vehicle 1. In general, the probabilities can be expressed as follows:

Pb=Probability of Battery 36 failing
Pf=Probability of Key Fob 20 failing
Pem=Probability of Electronic Module 32 failing
Pal=Probability that all latches 8-8C fail at same time Pal=Probability of all latches 8-8C failing at same time (latches 8-8C are in parallel and their failure is independent)

Pal=1−((1−Pflh)*(1−Pfrh)*(1−Pflh)*(1−Prrh))

Pcs=Probability backup system fails (backup power supply 48, backup module 38, keyfob 20) (system in series—failure occurs even if only one of the events occurs)

Pflh=Probability of Front LH latch 8 failing

Probability of latches for all doors failing simultaneously from outside electronically=Pel Pel=Pb*Pf*Pem*Pal (system in series—failure occurs even if only one of the events occurs)

Pbk=Probability of backup system failing

Pbk=Pcs*Pflh (system in series—failure occurs even if only one of the events occurs)

Popendoor=Probability of not being able to open any door from outside

Popendoor=1−(1−Pel)*(1−Pcs) (The primary and backup unlock systems and the backup systems are in parallel)

Accordingly, the probability of not being able to open at least one door from the outside of the vehicle is very low, provided that the individual components of the system do not have a high failure rate.

Figure 3:
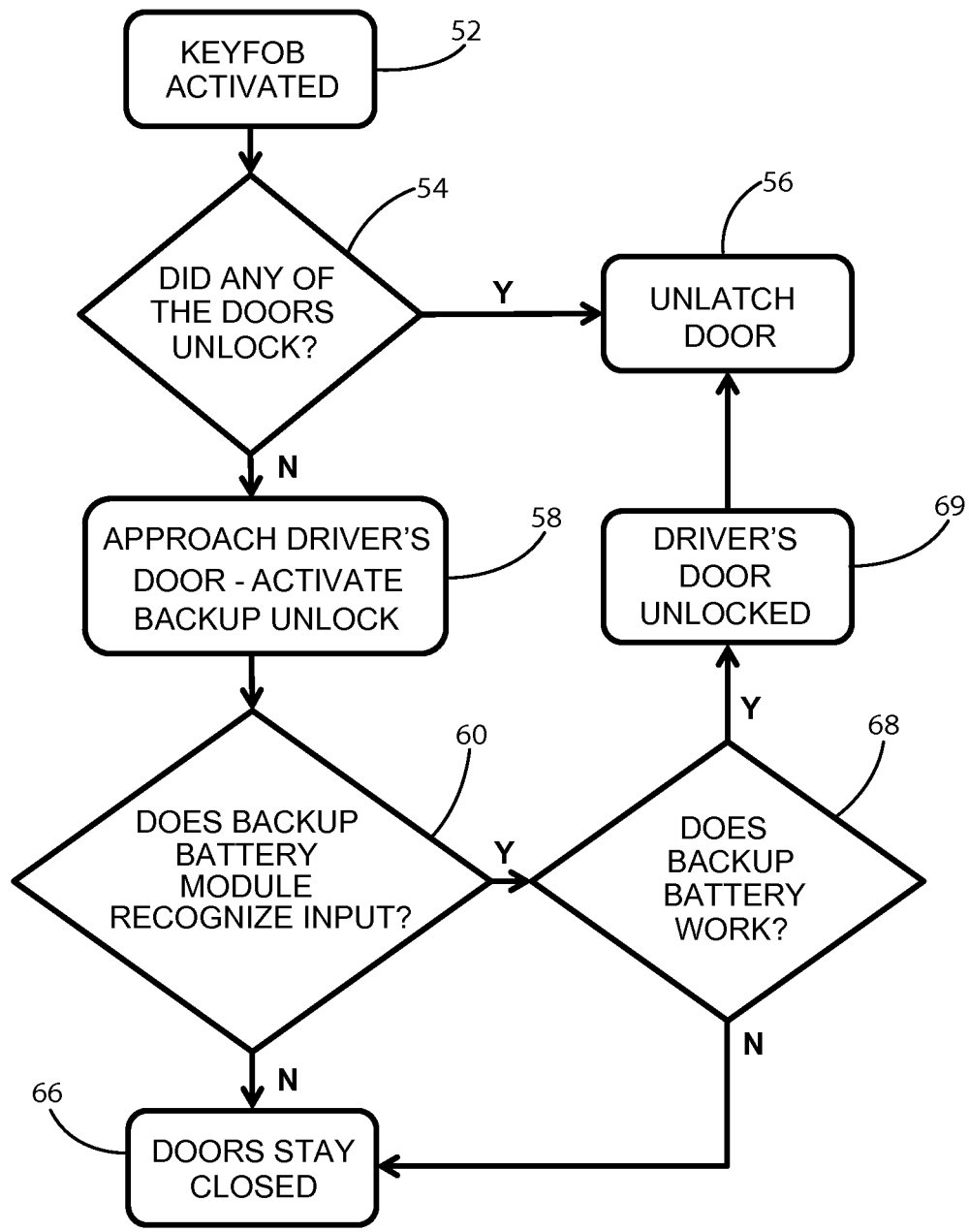
FIG. 3 is a flow chart showing operation of a door latch and powered lock according to one aspect of the present invention.

With further reference to FIG. 3, during operation the keyfob 20 may be actuated as indicated by the step 52. In step 52, the first input feature 30 (FIGS. 1 and 2) may be actuated to generate a first wireless signal 34 to the control module 22. At step 54, control module 22 determines if any of the locks 26-26C of latches 8-8C of the doors of the vehicle unlocked. If any of the doors did unlock, a user moves handle 14 and unlatches the door at step 56. If none of the doors unlock, a user then actuates the second input 32 to activate the backup module 38 as shown at step 58. The second battery 64 of keyfob 20 may comprise a lower power battery, such that second wireless signal 46 has lower power than the first wireless signal 34. Accordingly, at step 58 a user may need to approach the driver's door 2 in order to ensure that second wireless signal 46 has sufficient strength to be received by second receiver 40, thereby causing the backup module 38 to actuate (unlock) powered lock 26.

Referring again to FIG. 3, backup module 38 determines if second wireless signal 46 is recognized. In general, first and second wireless signals 34 and 46 may comprise a security code that must be recognized by control module 22 and backup module 38, respectively, in order for the control module 22 and backup module 38 to unlock the powered lock 26. If the backup module 38 does not recognize the second signal 46, the powered lock 26 remains locked as shown at step 66. If the second wireless signal 46 is recognized by the backup module 38 at step 60, and if the backup power supply 48 has sufficient power (step 68), the backup module 38 supplies power from backup power supply 48 to the powered lock 26 to thereby unlock the driver's door at step 69, thereby allowing a user to unlatch the door at step 56 by grasping and pulling on handle 14.

Figure 4:
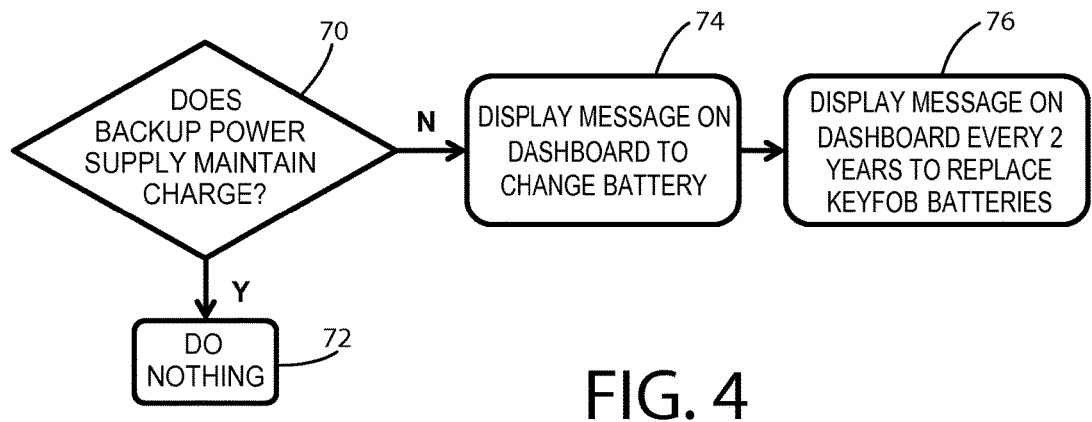
FIG. 4 is a flow chart showing battery recharge of the door lock system according to another aspect of the present invention.

With further reference to FIG. 4, the latch system 5 may be configured to recharge the backup power supply 48 if required. The control module 22 and/or backup module 38 may be configured to monitor the rechargeable backup power supply 48 as shown at step 70 of FIG. 4. If the backup power supply 48 does maintain a proper charge according to predefined criteria, the control module 22 and/or backup module 38 do not take any action as shown at step 72. In the event the backup power supply 48 does not maintain a proper charge at step 70, control module 22 and/or backup module 38 cause a message to be displayed on the vehicle dashboard indicating that the battery or backup power supply 48 must be changed/serviced as shown at step 74. As shown at step 76, the control module 22 and/or backup module 38 may also be configured to display a message on the dashboard every two years to replace the batteries 62 and/or 64 of keyfob 20. It will be understood that the message of step 74 could comprise an audible tone, written message, or the like. Furthermore, the message or signal could indicate that the backup power supply 48 needs to be serviced or repaired. It will be understood that the alert or display of step 76 could comprise various alerts other than a message to replace the keyfob batteries, and the message could be displayed at any suitable time frame.

Figure 5:
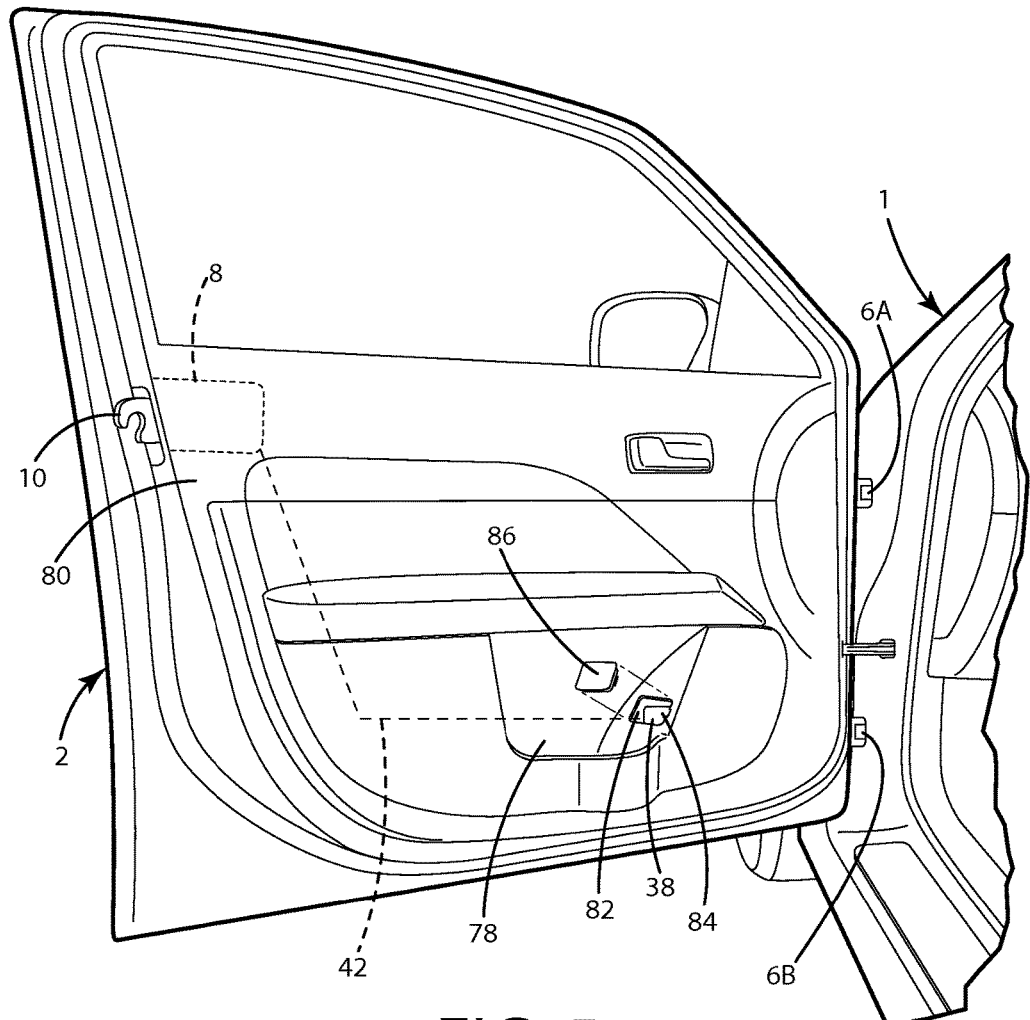
FIG. 5 is a partially fragmentary perspective view showing an interior of a vehicle door.

With further reference to FIG. 5, vehicle door 2 may include a map pocket 78 on an inner side 80 of door 2. The backup module 38 may be mounted in a cavity 82 that is accessible through an opening 84 in map pocket 78. A cover 86 may be removably attached to the door 2 to selectively close off opening 84. The opening 84 provides access to the backup module 38 to permit servicing and/or replacement of backup module 38, and to permit replacement of backup power supply 48 of backup module 38 as may be required. It will be understood that the arrangement of FIG. 5 is merely an example of a suitable location and mounting arrangement for the backup module 38. Alternatively, the backup module 38 may be mounted in an interior space of door 2 adjacent the exterior handle 14 (FIG. 1), whereby the backup module 38 is accessible by removing an exterior bezel 18 (FIG. 1).

Figure 6:
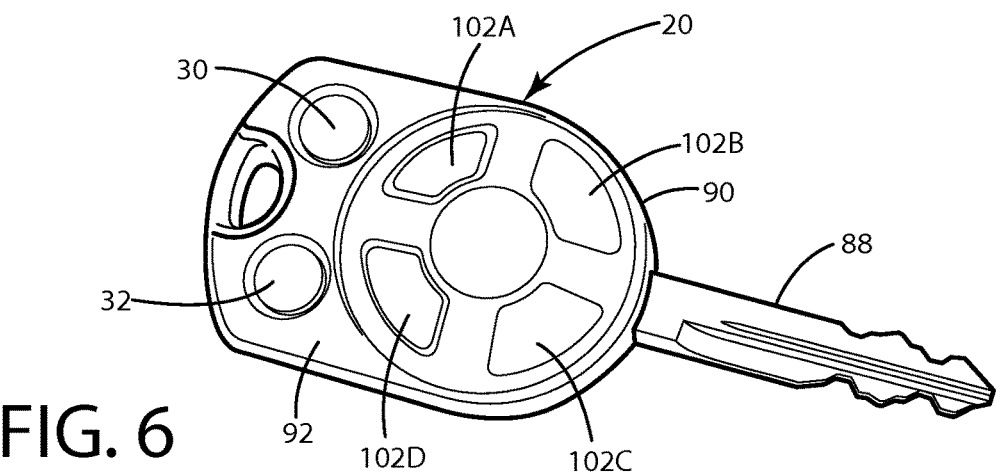
FIG. 6 is a perspective view showing a top side of a remote wireless fob according to one aspect of the present invention.
Figure 7:
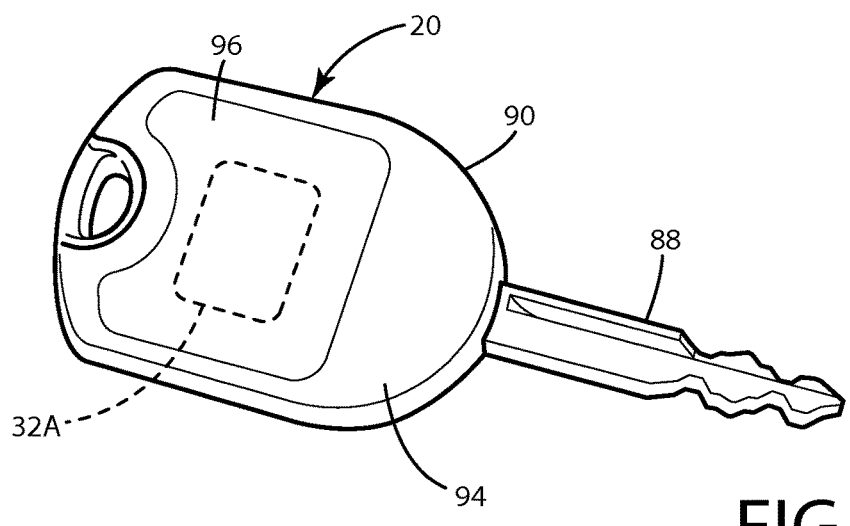
FIG. 7 is a perspective bottom view of the remote wireless fob of FIG. 6.
Figure 8:
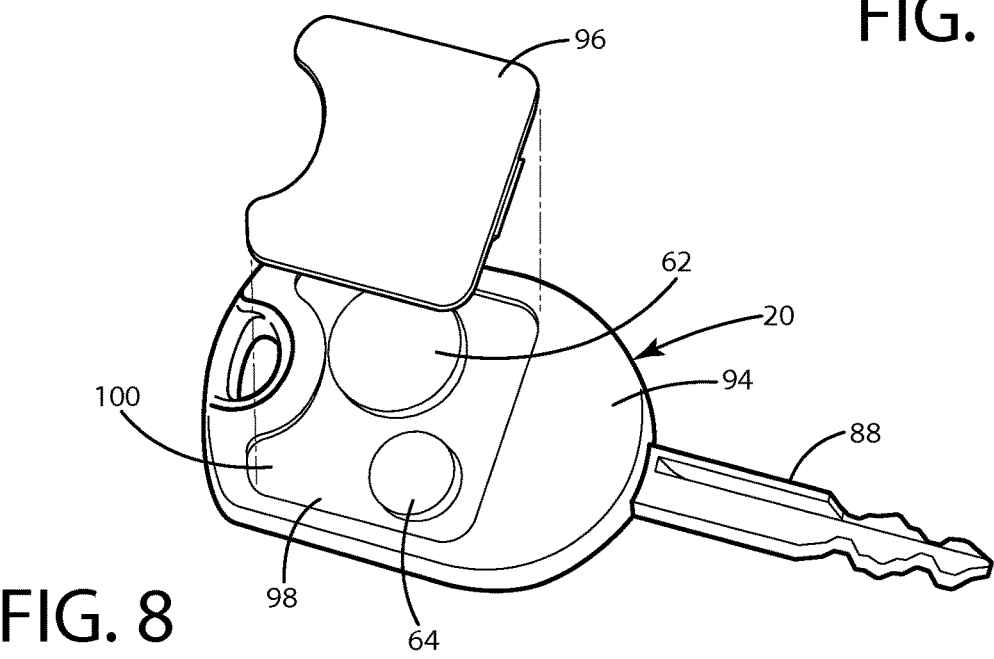
FIG. 8 is an exploded isometric view of the fob of FIG. 7 showing a cover in a removed configuration.

With further reference to FIGS. 6-8, keyfob 20 may include an ignition key 88. However, the ignition key 88 is optional, and the keyfob 20 could comprise a fob that does not include a key 88. In the illustrated example, the keyfob 20 includes a housing 90 having a front side 92 and a rear side 94. The first and second input features may comprise a first push button 30 and a second push button 32, respectively. A removable cover 96 selectively closes off an opening 98 and permits access to interior space 100 whereby first and second batteries 62 and 64 can be replaced. The keyfob 20 may include additional input features such as buttons 102A-102D that provide for control of the vehicle alarm and other such features. The first and second inputs (pushbuttons 30 and 32) may be positioned on the front side 92 of the keyfob 20. The pushbuttons 30 and 32 may have substantially the same size and configuration. However, the second input 32 may comprise a pushbutton or the like 32A (FIG. 7) having a substantially different configuration/appearance than the first input 30 (FIG. 6). In this way, the second input 32/32A may have a unique appearance/configuration whereby a user can readily distinguish between the two user inputs.

Significantly, the backup module 38 and backup transmitting features of keyfob 20 can be utilized instead of a conventional door lock cylinder, thereby eliminating the cost and complexity associated with conventional door lock cylinders and keys. Conventional door lock cylinders may take up significant space within vehicle doors, and the lock cylinder and associated linkage may need to be specifically designed for a particular vehicle door. In contrast, the backup module 38 may comprise a compact unit that can be mounted at numerous locations within the vehicle door 2. Specifically, because the backup module 38 can be operably connected to the latch 8 by an electrical line 42, specific mechanical linkage for a lock cylinder is not required in the latch system 5 of the present invention.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A keyless door latch system for doors of motor vehicles, the keyless door latch system comprising:
a movable door handle that is configured to be mechanically connected to a mechanical door latch by mechanical linkage such that movement of the door handle unlatches the mechanical door latch;
wherein the mechanical door latch includes a powered lock that is configured to be operably connected to a first electrical power supply, the powered lock defining an unlocked condition in which the door handle is mechanically connected to the mechanical door latch such that the latch is released upon movement of an exterior door handle when the powered lock is unlocked, the powered lock further defining a locked condition in which the door handle is mechanically disconnected from the mechanical door latch such that the latch does not release upon movement of an exterior door handle when the powered lock is locked;
a first electrical power supply;
an electronic controller operably connected to the powered lock;
a backup device including a second electrical power supply configured to be operably connected to the powered lock; and
a user input device configured to communicate with the electronic controller and with the backup device, the user input device including first and second user input features, and wherein the door latch system is configured to cause the electronic controller to unlock the powered lock utilizing electrical power from the first electrical power supply if a user actuates the first user input feature, and wherein the door latch system is configured to cause the backup device to unlock the powered lock utilizing electrical power from the second electrical power supply if a user actuates the second user input feature, whereby a lock cylinder is not required to unlock the door latch in the event the door latch cannot be unlocked utilizing power from the first electrical power supply.

2. The keyless door latch system of claim 1, wherein:
the user input device comprises a wireless communication device that transmits wireless signals to the electronic controller and to the backup device.

3. The keyless door latch system of claim 1, wherein:
the user input device comprises a portable hand held transmitter that transmits wireless signals to the electronic controller and to the backup device.

4. The keyless door latch system of claim 3, wherein:
the first user input feature comprises a first switch, and the second user input feature comprises a second switch.

5. The keyless door latch system of claim 4, wherein:
the user input device includes first and second portable electrical power supplies, and wherein the second portable electrical power supply is configured to provide power to enable transmitting a wireless signal to the backup device to unlock the powered lock upon actuation of the second switch even if the first portable electrical power supply fails.

6. The keyless door latch system of claim 1, wherein:
the first electrical power supply comprises a battery that is configured to be operably connected to an electrical system of a motor vehicle;

the second electrical power supply comprises at least one of a capacitor and a rechargeable battery.

7. The keyless door latch system of claim 6, wherein:
the second electrical power supply comprises a capacitor.

8. The keyless door latch system of claim 6, wherein:
the second electrical power supply is configured to be recharged utilizing electrical power from an electrical system of a vehicle.

9. The keyless door latch system of claim 8, wherein:
the electronic controller is configured to determine if the second electrical power supply is storing sufficient electrical energy to operate the powered lock, and wherein the electronic controller generates a signal if the second electrical power supply is not storing sufficient electrical energy to thereby alert a user that action should be taken to restore operation of the second electrical power supply.

10. The keyless door latch system of claim 1, wherein:
the backup device comprises a module configured to be mounted in a vehicle door.

11. The keyless door latch system of claim 1, wherein:
the backup device includes an antenna configured to receive a wireless signal from the user input device whereby the backup device unlocks the powered lock.

12. A vehicle door latch comprising:
a movable handle connected to a latch by mechanical linkage;
an electrically powered lock that disconnected the linkage when locked;
first and second electrical power supplies;
a wireless remote fob having first and second user inputs that, when actuated, cause electrical power to be supplied to the lock from the first and second electrical power supplies, respectively, whereby the lock can be unlocked utilizing power from either electrical power supply.

13. The vehicle door latch of claim 12, wherein:
the wireless remote fob generates a first wireless signal upon actuation of the first user input; and including:
a first receiver configured to receive the first wireless signal, and wherein the first receiver is configured to cause the first electrical power supply to supply electrical power to the electrically powered lock such that the electrically powered lock is unlocked.

14. The vehicle door latch of claim 13, wherein:
the wireless remote fob generates a second wireless signal upon actuation of the second user input; and including:
a second receiver configured to receive the second wireless signal, and wherein the second receiver is configured to cause the second electrical power supply to supply electrical power to the electrically powered lock such that the electrically powered lock is unlocked.

15. The vehicle door latch of claim 14, wherein:
the first and second user inputs comprise first and second pushbuttons.

16. The vehicle door latch of claim 15, wherein:
the wireless remote fob is configured to receive first and second batteries, respectively, that supply power to generate the first and second wireless signals, respectively.

17. The vehicle door latch of claim 12, wherein:
the first electrical power supply comprises a main vehicle battery;
the second electrical power supply comprises a backup power supply having sufficient electrical power to actuate the electrically powered lock even if the main vehicle batter fails.

18. A keyless door latch system for doors of motor vehicles, the keyless door latch system comprising:
- a movable door handle;
- a mechanical door latch;
- a mechanical linkage configured to mechanically interconnect the door handle and the mechanical door latch;
- a powered lock that selectively disconnects the mechanical linkage such that movement of the door handle does not unlatch the mechanical door latch when the powered lock is in a locked state, and wherein, when the powered lock is in an unlocked state, the door handle and the mechanical latch are mechanically interconnected by the mechanical linkage such that movement of the door handle mechanically unlatches the mechanical door latch;
- first and second electrical power supplies; and
- a user input device having first and second user input features; and wherein:
- the door latch system is configured to supply electrical power from the first electrical power supply to the powered lock to unlock the powered lock by mechanically interconnecting the door handle and the mechanical door latch upon actuation of the first user input feature, and wherein the system is configured to supply electrical power from the second electrical power supply to unlock the powered lock by mechanically interconnecting the door handle and the mechanical door latch upon actuation of the second user input feature.

19. A keyless door latch system for doors of motor vehicles, the keyless door latch system comprising :
- a door latch;
- a powered lock that selectively prevents unlatching of the door latch when the powered lock is in a locked state;
- first and second electrical power supplies; and
- a user input device having first and second user input features; and wherein:
- the door latch system is configured to supply electrical power from the first electrical power supply to the powered lock to unlock the powered lock upon actuation of the first user input feature, and wherein the system is configured to supply electrical power from the second electrical power supply to unlock the powered lock upon actuation of the second user input feature;
- wherein the user input device comprises a wireless portable device that is configured to generate a first wireless signal upon actuation of the first user input feature, and to generate a second wireless signal upon actuation of the second user input feature; and including:
- first and second receivers operably connected to the first and second electrical power supplies, respectively, and wherein the first and second receivers are configured to receive the first and second wireless signals, respectively, to unlock the powered lock.

20. The keyless door lock system of claim 18, wherein:
- the wireless portable user input device includes a first battery that is operably connected to the first user input feature, and a second battery that is operably connected to the second user input feature.

* * * * *